(12) United States Patent
Fischer

(10) Patent No.: US 6,817,596 B2
(45) Date of Patent: Nov. 16, 2004

(54) TRAY COLUMN

(75) Inventor: Markus Fischer, Constance (DE)

(73) Assignee: Sulzer Chemtech AG, Winterthur (SE)

( * ) Notice: Subject to any disclaimer, the term of this patent is extended or adjusted under 35 U.S.C. 154(b) by 0 days.

(21) Appl. No.: 10/304,255

(22) Filed: Nov. 25, 2002

(65) Prior Publication Data

US 2003/0102581 A1 Jun. 5, 2003

(30) Foreign Application Priority Data

Dec. 5, 2001 (EP) .............................................. 01811181
Apr. 9, 2002 (EP) .............................................. 02405279

(51) Int. Cl.$^7$ ................................................. B01F 3/04
(52) U.S. Cl. .................................. 261/114.1; 261/114.5
(58) Field of Search ........................... 261/114.1, 114.2, 261/114.3, 114.4, 114.5; 202/158

(56) References Cited

U.S. PATENT DOCUMENTS

| | | | | |
|---|---|---|---|---|
| 3,445,094 A | * | 5/1969 | Shobe | 261/114.1 |
| 3,729,179 A | * | 4/1973 | Keller | 261/114.1 |
| RE27,908 E | * | 1/1974 | Nutter et al. | 261/114.1 |
| 4,159,291 A | * | 6/1979 | Bruckert et al. | 261/114.1 |
| 5,164,125 A | * | 11/1992 | Binkley et al. | 261/114.1 |
| 5,453,222 A | * | 9/1995 | Lee et al. | 261/114.1 |
| 5,454,989 A |   | 10/1995 | Nutter | |
| 6,003,847 A | * | 12/1999 | Lee et al. | 261/114.1 |
| 6,224,043 B1 |   | 5/2001 | Fan et al. | |
| 6,250,611 B1 |   | 6/2001 | Pilling et al. | |
| 6,390,454 B1 | * | 5/2002 | Urbanski et al. | 261/114.1 |
| 6,460,834 B2 | * | 10/2002 | Konijn | 261/114.1 |
| 2001/0013667 A1 |   | 8/2001 | Konijn | |

FOREIGN PATENT DOCUMENTS

| | | |
|---|---|---|
| EP | 0 001 448 A1 | 4/1979 |
| SU | 1377136 A1 | 2/1986 |

* cited by examiner

Primary Examiner—Scott Bushey
Assistant Examiner—T. Woodruff
(74) Attorney, Agent, or Firm—Townsend and Townsend and Crew LLP

(57) ABSTRACT

The tray column (1) has downcomers (3) for transporting a liquid between adjacent trays (2). The liquid transport takes place in each downcomer through a plurality of discharge apertures (32) onto a loaded tray. Liquid flows out of the discharge apertures in the form of jets (60) that blend into a regionally divergent flow field (6) on striking the loaded tray. The flow field has transverse components of the flow speed with respect to a longitudinal main flow direction (61). Guide elements (4) are arranged beneath the discharge apertures and at a spacing from the loaded tray which each guide the impulse of liquid corresponding to the divergent flow field. The guide elements contribute to forming the transverse speed components such that the longitudinal component of the flow speed has a largely constant profile in each plane perpendicular to the main flow direction. The discharge apertures are preferably made in different sizes in a graduated fashion to be smaller in a central region than in adjacent flank regions.

15 Claims, 5 Drawing Sheets

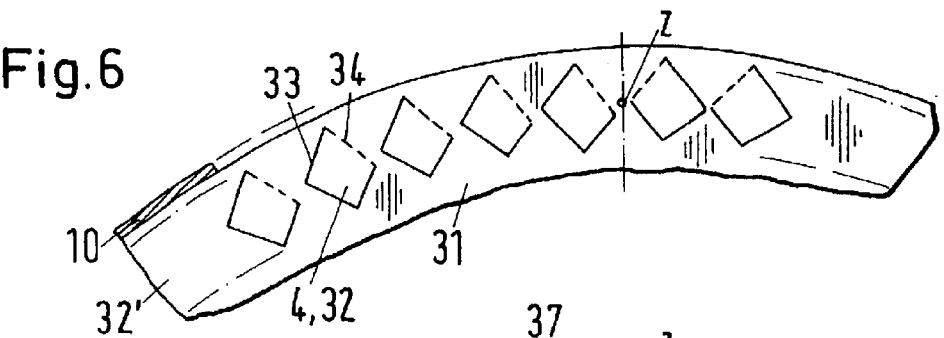
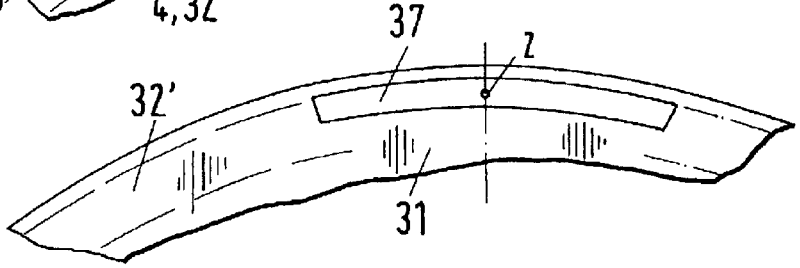
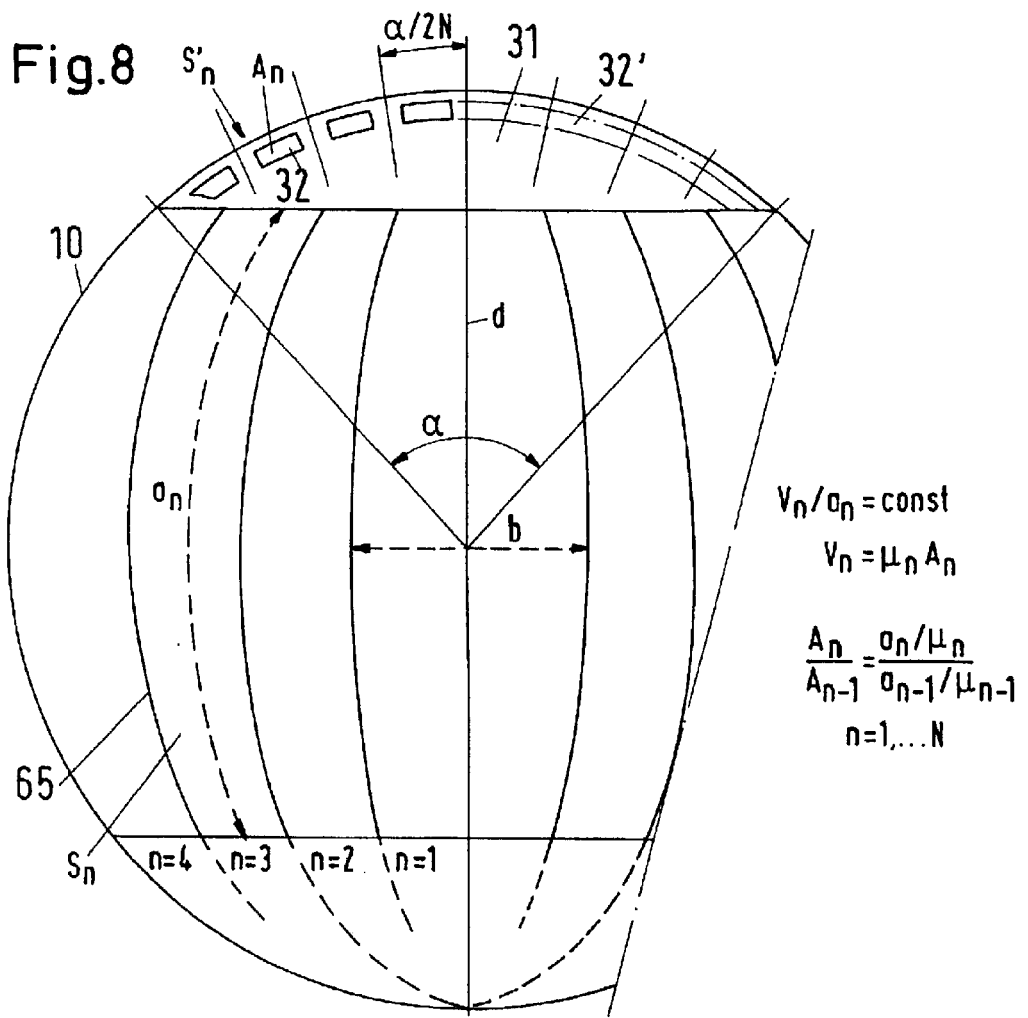

TRAY COLUMN

BACKGROUND OF THE INVENTION

The invention relates to a tray column with a flowing liquid that has downcomers for transporting the liquid between adjacent trays. The liquid in each downcomer is transported through a plurality of discharge apertures onto a loaded tray. Liquid flowing out of the discharged apertures in the form of jets blends into a regionally divergent flow field when striking the loaded tray. In the flow field there are transverse components of the flow speed with respect to a longitudinal main flow direction.

A tray column contains perforated trays (also known as partition trays) on which in each case a gas phase flowing from the bottom to the top in cross-flow is brought into contact with a liquid phase flowing on the tray for the purpose of an exchange of materials. At least one downcomer is installed in each partition tray for a liquid transport between this tray and a tray lying beneath it which is called a "loaded tray" in the following. A tray column is described in U.S. Pat. No. 5,454,989 whose downcomers are made in a special form: discharge apertures are arranged in a base which forms a lower termination of the downcomer. The base is disposed at a spacing above a level which is given by the upper boundary layer of a liquid/gas mixture on the loaded tray. The discharge apertures are limited to a region from which the liquid dispersed in the form of jets has to propagate over the loaded tray partly transversely to a main direction of flow. A further tray column with similar downcomers is known from U.S. Pat. No. 6,250,611.

The propagation of liquid on the loaded tray takes place in an inhomogeneous flow field which has high flow speeds in a central region and low speeds in lateral regions. The inhomogeneities of the flow field mean that the liquid flows through the volume of the exchange of materials with different dwelling times. To obtain an improved exchange of materials, the flow field must be influenced such that a matching of dwelling times results.

SUMMARY OF THE INVENTION

It is the object of the invention to further develop the tray column such that an improved exchange of materials is obtained for the individual partition trays by influencing the flow field. This object is attained by arranging guide elements beneath, on and above, or after, discharge apertures and at a spacing from the loaded tray. Each guide element guides the impulse of liquid corresponding to the divergent flow field and thereby contributes to forming the transverse speed components so that the longitudinal component of the flow speed has a largely constant profile in each plane perpendicular to the main flow direction. The discharge apertures are preferably made in different sizes in a graduated fashion so that they are smaller in a central region than in adjacent flank regions. The discharge apertures are arranged in a row, and each guide element is associated with one of the discharge materials. the flow field is regulated so that the dwelling times are matched.

The tray column has downcomers for a transport of a liquid between adjacent trays. The liquid transport takes place in each downcomer through a plurality of discharge apertures onto a loaded tray. Liquid which flows out of the discharge apertures in the form of jets blends into a regionally divergent flow field on striking the loaded tray, said flow field having transverse components of flow speed with respect to a longitudinal main direction of flow. Guide elements are arranged beneath the discharge apertures and at a spacing from the loaded tray. These each guide the liquid impulse in a manner corresponding to the divergent flow field. The formation of the transverse speed components is contributed to by the guide elements such that the longitudinal components of the flow speed in each plane have a largely constant profile perpendicular to the main flow direction. The discharge apertures are preferably formed in different sizes in a graduated fashion to be smaller in a central region than in adjacent flank regions. dr

BRIEF DESCRIPTION OF THE DRAWINGS

In the following, the invention will be explained with reference to the drawings.

FIGS. 6, 7 show variant embodiments of the discharge apertures;

FIG. 8 is a representation of a design method for the discharge apertures;

DESCRIPTION OF THE PREFERRED EMBODIMENTS

Figure 1:
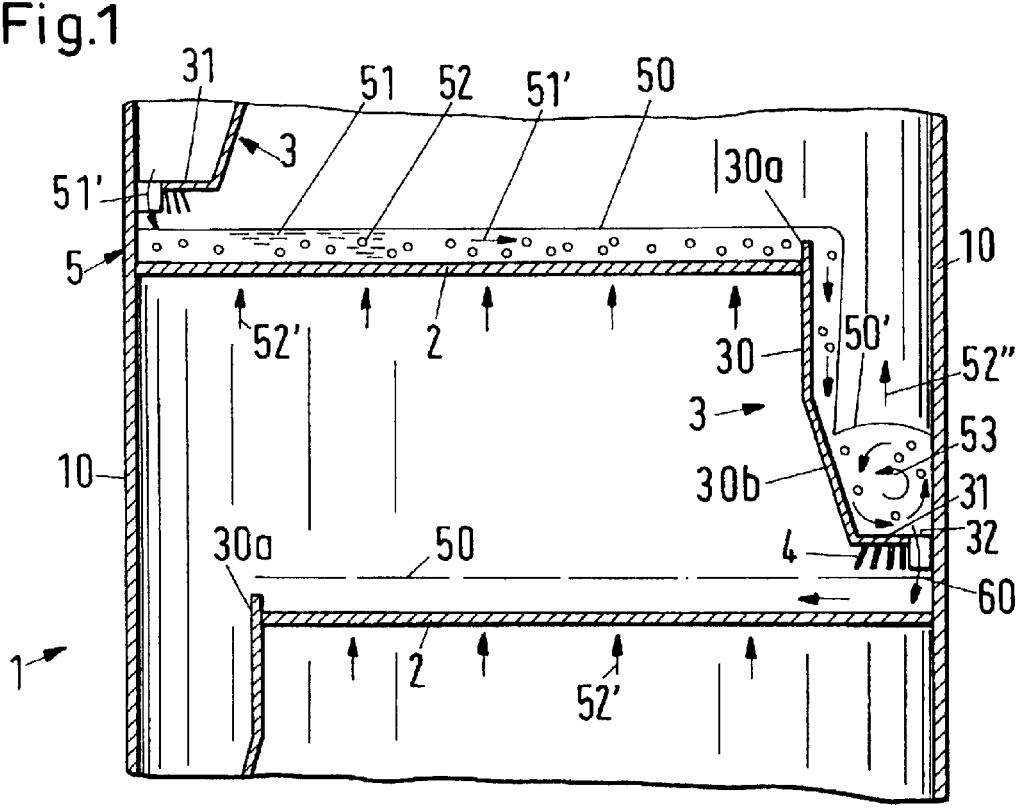
FIG. 1 is a section of a tray column in accordance with the invention sectioned longitudinally comprising two adjacent partition trays.
Figure 2:
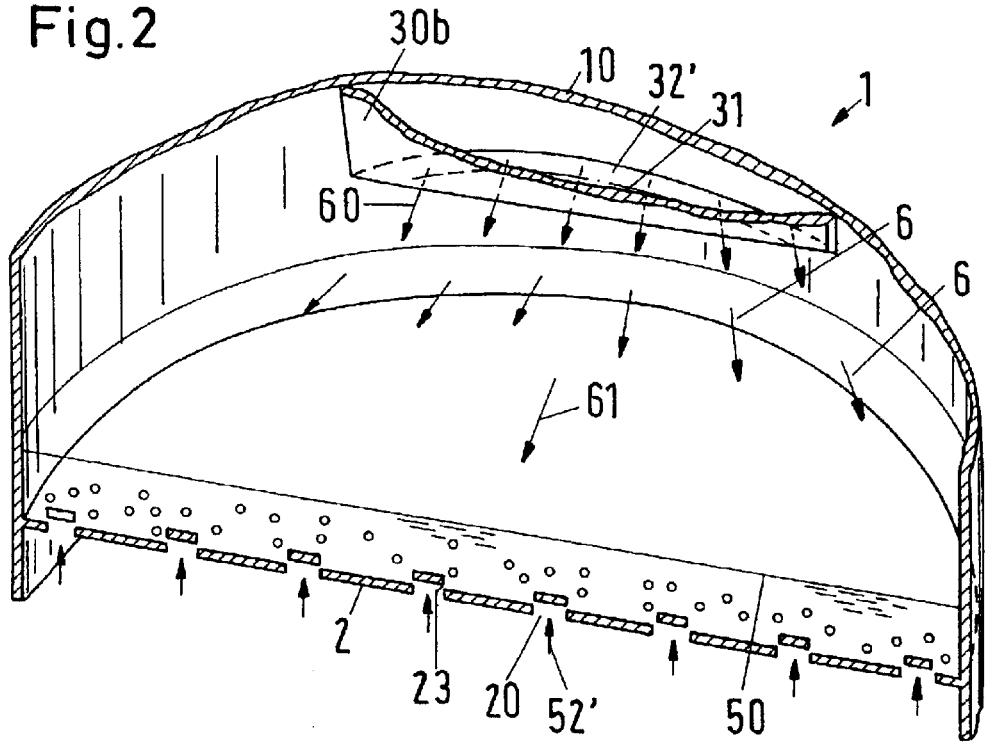
FIG. 2 shows flow ratios on and above a partition tray of the tray column shown in FIG. 1.

The column tray 1 shown in FIGS. 1 and 2 includes partition trays 2. A liquid phase 51 (arrows 51') flows out of a downcomer 3 and, in the form of a liquid/gas mixture 5, over the tray 2 to a further downcomer 3 by which a further liquid transport to the adjacent tray 2 takes place—while separating off the gaseous portion. A gas phase 52 (arrows 52') flows from the bottom to the top through perforations 23 of the trays 2 and crosses the liquid/gas mixture 5 in cross-flow in the form of bubbles. An exchange of materials and/or of heat takes place between the coexisting phases 51 and 52.

The liquid/gas mixture 5 consists of a liquid-rich lower region, whose upper boundary lies at a level 50, and of a gas-rich froth which is disposed above the level 50. The froth is not shown in FIGS. 1 and 2. A base with a plurality of discharge apertures 32 forms the lower termination of the downcomer 3. The base is located at a distance above the level 50.

The discharge apertures 32 are limited to a region 32' from where the liquid 51 dispersed in the form of jets 60 propagates over the loaded tray 2. The liquid jets 60, which flow out of the discharge apertures 32, blend into a regionally divergent flow field 6 on striking the loaded tray 2, said flow field having transverse speed components with respect to a longitudinal main flow direction 61. The discharge apertures 32 are—at least in part—provided with guide elements 4 which each guide the impulse of the liquid jet 60, corresponding to the desired formation of the divergent flow field 6, and in this connection contribute in particular to the transverse components of the flow speed being made sufficiently large.

The discharge apertures 32 are arranged in a ring segment 32' adjacent to a column wall 10. The liquid jets 60 are guided on the one hand by the column wall 10 and on the other hand, at least in part, through vane-like guide elements 4 which are each provided at the rim of a discharge aperture 32. Each guide elements 4 is designed such that its position and its inclination correspond to the transverse speed components to be effected. Due to the guide elements 4, in the lateral regions of the flow field 6 matchings the speeds at the inner regions. As a result, the dwelling times are matched and improved results in the exchange processes results.

Figure 3:
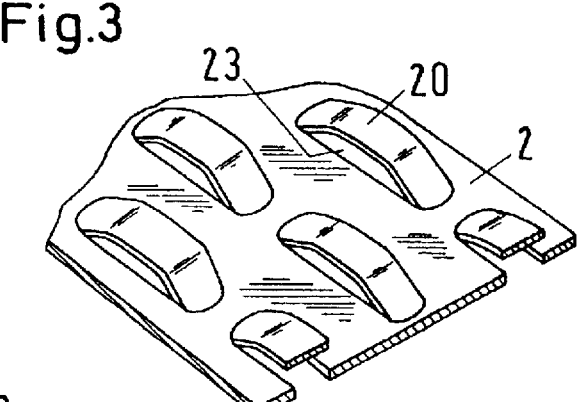
FIG. 3 shows grate elements of a partition tray.
Figure 4:
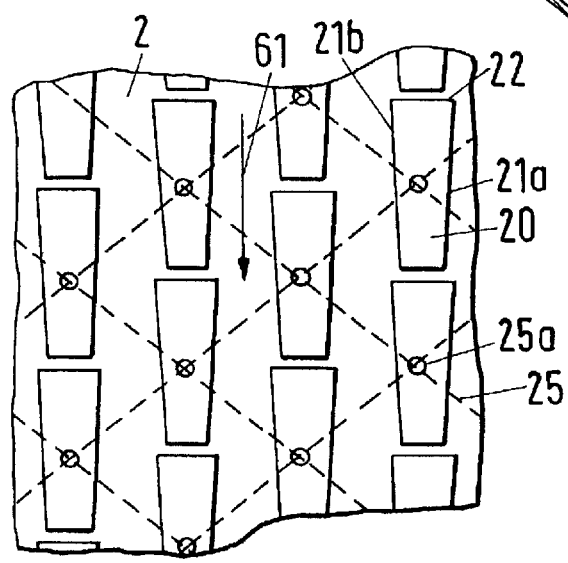
FIG. 4 shows a grid arrangement with grate elements.

The perforation of the trays 2 is provided, for example, by a plurality of grate elements 20 such as are shown in FIGS. 3 and 4. (The trays 2 can also be made, for example, as sieve bases). The grate elements 20 each have the shape of a trapezium, with non-parallel flanks 21a and 21b of the trapezium being longer than a base side 22. The base sides 22 are oriented transversely to the main flow direction. The flanks of the grate elements 20 are formed as slots 23. The grate elements 20 taper in the main flow direction 6 such that the gas 52 discharged through the slots 23 has a conveying effect on the transport of the liquid 51. All grate elements 20 preferably all have the same orientation and are arranged at intersection points 25a of a regular grid 25.

The tray column 1 described has a circular cross-section. A downcomer 3 is installed in each tray 2. The downcomers 3 of adjacent trays 2 are arranged diametrically opposite one another.

A part of the downcomer 3, which takes up a space region between an inner wall 30 and the column wall 10 directly above the base 31 has a downwardly tapering shape due to an incline wall part 30b. The liquid/gas mixture 5 flowing into the downcomer via a weir is dammed up to a stationary level 50' in the tapering part. The gas phase 52 (arrow 52") is precipitated from the mixture 5. A liquid roller 53 is formed which is driven by the inflowing liquid 51. Some of the liquid 51 is continuously transported from the liquid roll 53 through the discharge apertures 32. Due to the formation of the liquid roller 53, the kinetic energy of the liquid flow is only partly dissipated. The kinetic energy which remains is used after the further transport onto the loaded tray 2 for influencing the divergent flow field 6.

Figure 5:
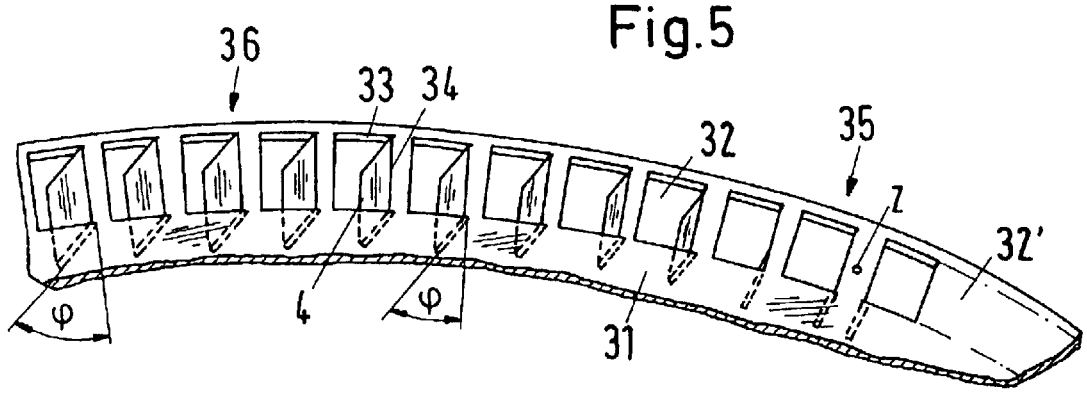
FIG. 5 shows a row of discharge apertures of a downcomer for a tray column in accordance with the invention.

So that an avoidable dissipation of the kinetic energy does not result during the outflow of the liquid 51 from the discharge apertures 32, the discharge apertures 32 are arranged in a row. A first example is shown in FIG. 5. The discharge apertures 32 are produced by partially cut out inside surfaces (cutting edge 33) and by inside surfaces bent out around an edge 34. The bent out inside surfaces form the vane-like guide elements 4.

The guide elements 4 have different inclination angles $\phi$. Relative to the centre Z of the row of discharge apertures 32, the inclination angle $\phi$ grows gradually as the distance to the centre Z increases; it grows in particular from 0° to 60°, preferably to 45°.

In the embodiment described with reference to FIGS. 1, 2 and 5, the discharge apertures 32 are made in different sizes. With the row-like arrangement, the discharge apertures 32 are smaller in a central region 35 of the row than in two flank regions 36 adjacent to the medium region 35, and indeed such that specifically more liquid is dispensed through the larger discharge apertures 32 relative to the length of the row. This is necessary since additional amounts of liquid 51 are required on the loaded tray 2 for the lateral regions of the divergent flow field 61, said amounts having to be dispensed through the flank regions 36 of the downcomer 3 into the lateral regions.

In the embodiment shown in FIG. 6, the discharge apertures 32 have a different orientation. The bending edges 34 are no longer perpendicular to the column wall 10. For reasons of simplicity, all discharge apertures 32 are drawn equally large. However, it is also necessary here for the discharge openings 32 to be made larger in flank regions. The angle between the bending edge 34 and the column wall 10 can also be a variable parameter.

In the embodiment of FIG. 7, a row of discharge openings 32, which are arranged in the strip 32' shown by chain-dotted lines, has a slot-like aperture 37 in the centre in whose region only the column wall 10 is provided to guide the liquid 51.

One can proceed as follows to design the discharge apertures 32: As the representation in FIG. 8 shows, the partition tray 2 is divided in the region between the base 31 of a downcomer 3 (seen in plan view) and the discharge weir 30a of the following downcomer 3 by means of ellipses 65 into 2N strips $S_n$ (n=1, . . . N; in the example, N=4). The large axes of the ellipses coincide with the column diameter d lying in the main flow direction 61. The small axes each differ by a constant amount b (=d/N); the smallest ellipse has degenerated to a stretch lying on the diameter d. The central length of a strip $S_n$ is designated by (n=1, . . . N).

The base 31 is divided into 2N sectors $S'_n$ (n=1, . . . N) with angles $\alpha/2N$ of equal size, with the angle $\alpha$ being the central angle which is defined by the base 31 in the centre of the column. Each sector $S'_n$ has a discharge aperture 32 with an area $A_n$ associated with it. A liquid jet 60 passes through such a discharge aperture 32 with a volume flow $V_n$. The ratio $V_n$ to $A_n$ is the outflow figure $\mu_n$. This figure is a measure for the outflow reduction which depends on the design of the discharge aperture 32. The outflow figure $\mu_n$ depends on the shape of the guide element 4 and in particular on its inclination angle $\phi$. Instead of one discharge aperture 32, more than one per sector $S'_n$ can also be provided. In the following, only the case will be discussed that each sector $S'_n$ has only one discharge aperture 32.

So that a matching of the dwelling times over the flow field results, the ratio $a_n$ to $V_n$, which is proportional to the dwelling time in the corresponding strip $S_n$, must be of equal size in each strip $S_n$. One thus obtains the relationship set forth in FIG. 8 for the areas $A_n$. By pre-setting the total volume flow (=$2V_1+2V_2+ \ldots +2V_N$), the design of the areas $A_n$ can be carried out, with it being a pre-requisite that the outflow figures $\mu_n$ are known (for example due to trials carried out).

Figure 9:
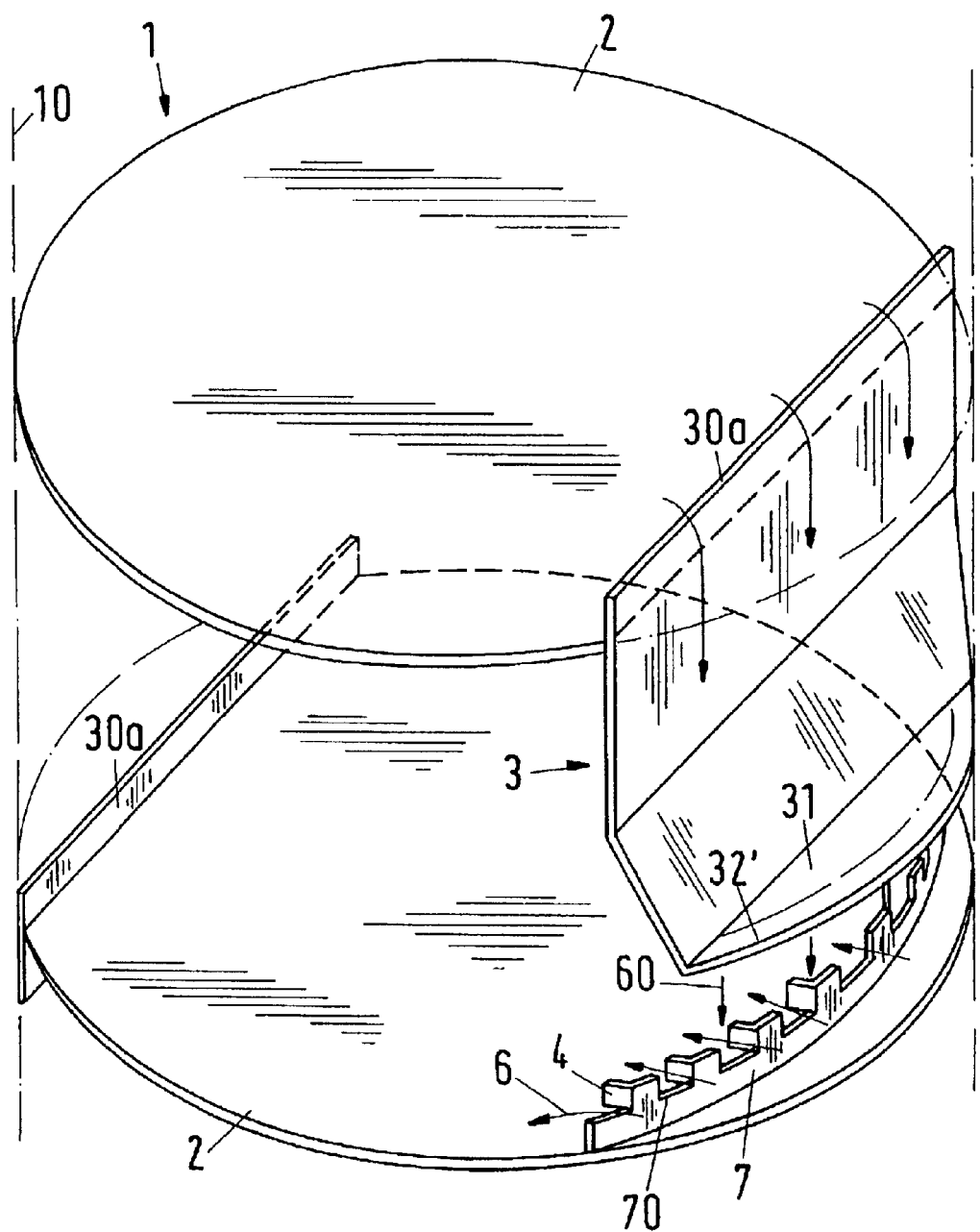
FIG. 9 shows a flow breaker with guide elements which is arranged beneath the downcomer on the partition tray.

In FIG. 9, a weir-like flow breaker 7 is shown which is arranged on the partition tray 2 beneath the downcomer 3 and beneath discharge apertures 32 (not shown) disposed in the strip 32'. The outer wall of the tray column 1 has been omitted in the presentation and only indicated by chain-dotting. At least some of the guide elements 4 are provided at an overflow edge 70 of the flow breaker 7.

The flow breakers 7 are advantageously produced in each case from a sheet metal strip. The guide elements 4 can be produced simply from the sheet metal strip by cutting and bending out of part areas. The flow breaker 7 can be composed of a plurality of parts. It can—as shown in FIG. 9—be curved; however, it can also have the shape of a polygon train with a plurality of straight sections.

When the flow breaker 7 is used, it is possible for no guide elements to be arranged at the discharge apertures 32. In this case, the guide elements 4 are thus not parts of the downcomer 3, but only such of the flow breaker 7. The discharge apertures 32 can all be the same size.

In addition to the embodiments described above, further modifications of the downcomer 3 are possible.

For example, the guide elements 4 can be bent upwardly instead of downwardly in order to influence the inflow ratios upsteam before the discharge apertures 32. The flow can also be influenced with guide elements 4 arranged upsteam such that the transversal impulse components required for a homogeneous flow field result.

Figure 10:
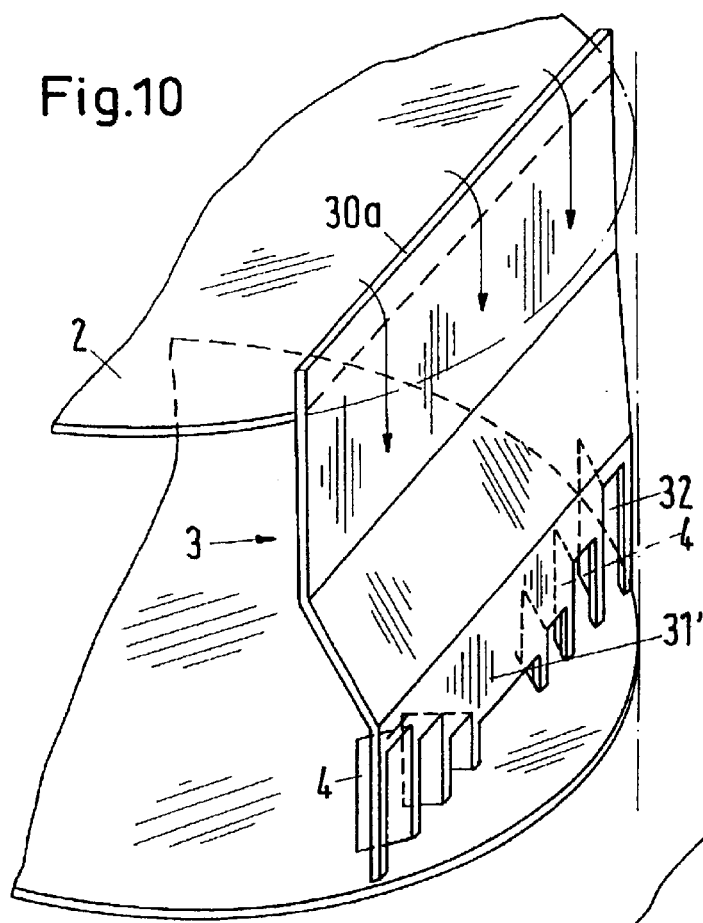
FIGS. 10, 11 show two modifications of the downcomer in accordance with the invention.
Figure 11:
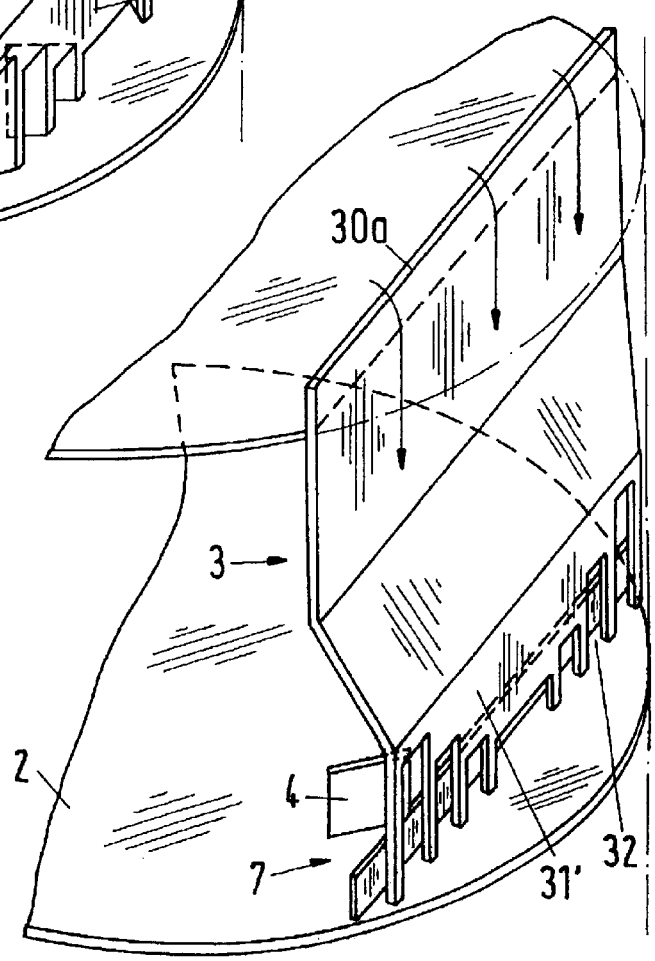

In another alternative, a vertical wall piece 31', instead of base 31, forms part of the lower termination of the downcomer 3: see FIGS. 10 and 11. FIG. 10 shows an embodiment which corresponds to that of FIGS. 1 and 5. FIG. 11 shows an embodiment which is analogous to that shown in FIG. 9. Here a flow breaker 7 is arranged before the guide elements 4. Only one of the guide elements 4 of the flow breaker 7 is visible in FIG. 11. However, as in the example of FIG. 9, a plurality of guide elements 4 are present.

What is claimed is:

1. A tray column (1) with a flowing liquid (51) and having downcomers (3) for a transport of the liquid between adjacent trays (2), with the liquid transport taking place in each downcomer through a plurality of discharge apertures (32) onto a loaded tray and liquid flowing out of the discharge apertures in the form of jets (60) blending into a regionally divergent flow field (6) on striking the loaded tray, said flow field having transverse components of the flow speed with respect to a longitudinal main flow direction (61), wherein guide elements (4) are arranged a) beneath the discharge apertures and at a spacing from the loaded tray, or b) on and above the discharge apertures, or c) after the discharge apertures, said guide elements (4) each guiding the impulse of liquid corresponding to the divergent flow field and thereby contributing to forming the transverse speed components such that the longitudinal component of the flow speed has a largely constant profile in each plane perpendicular to the main flow direction;

wherein the discharge apertures are arranged in a row and made in different sizes in a graduated fashion to be smaller in a central region than in adjacent flank regions; wherein the guide elements are each associated with one of the discharge apertures; and wherein each guide element adjoins a rim of the associated discharge opening.

2. A tray column in accordance with claim 1, wherein the discharge apertures (32) are arranged in a ring segment (32') adjacent to a column wall (10); and wherein the liquid (51) flowing out of the discharge apertures can be guided by the column wall and, at least in part, by the guide elements (4), or wherein the discharge apertures (32) are arranged in a vertical wall piece (31'), with each guide element being made in vane-like manner and its position and inclination being made corresponding to the transverse speed components to be produced.

3. A tray column in accordance with claim 1, wherein the discharge apertures (32) are produced at least in part by partially cut-out inner surfaces and inner surfaces bent out around an edge (34); wherein the bent out inner surfaces form the vane-like guide elements (4), with the guide elements having different inclination angles φ; and wherein the inclination angle grows gradually—relative to a center Z in the central region—as the distance to the center Z increases.

4. A tray column in accordance with claim 1, wherein a weir-like flow breaker (7) is arranged in each case beneath or in front of the discharge apertures (32) of individual or of all downcomers (3); and wherein at least some of the guide elements (4) are arranged at an overflow rim (70) of the flow breaker.

5. A tray column in accordance with claim 4, wherein the flow breakers (7) are each produced from a sheet metal strip; and wherein the guide elements (4) are produced from the sheet metal strip by cutting and bending out of part areas.

6. A tray column in accordance with claim 4, wherein the guide elements (4) are only parts of the flow breakers (7).

7. A tray column in accordance with claim 1, wherein the discharge apertures (32) are each arranged in a wall piece which forms a lower termination of the downcomer (3) or part of a lower termination, the wall piece being a horizontal base (31) or a vertical wall piece (31'); and wherein part of the downcomer, which takes up a space region between an inner wall (30, 30b) and the column wall (10) directly above the base, is made downwardly tapering.

8. A tray column in accordance with claim 1, wherein the trays (2) include a plurality of grate elements (20) which each have the shape of a trapezoid, with non-parallel flanks (21a, 21b) of the trapezoid being longer than a base side (22); and wherein the base sides are oriented transversely to the main flow direction (61), the flanks of the grate elements are formed as slots (23), the grate elements taper in the main flow direction and all grate elements have the same orientation and are arranged on a regular point grid (25).

9. A tray column in accordance with claim 1, wherein the trays have a circular cross-section; wherein a downcomer (3) is installed in each tray (2); and wherein the downcomers of adjacent trays are arranged diametrically opposite one another.

10. A tray column according to claim 4 wherein the guide elements and the overflow rim are welded together.

11. A tray column according to claim 3 wherein the inclination angles grow gradually from 0° to 60°.

12. A tray column according to claim 11 wherein the inclination angles grow from 0° to 45°.

13. A tray column for a flowing liquid comprising a plurality of adjacent downcomers for transporting the liquid between adjacent trays, with the liquid transport taking place in each downcomer through a plurality of discharge apertures onto a loaded tray and liquid flowing out of the discharge apertures in the form of jets blending into a regionally divergent flow field when striking the loaded tray, the flow field having transverse components of the flow speed with respect to a longitudinal main flow direction, guide elements arranged one of beneath the discharge apertures and at a spacing from the loaded tray, on and above the discharge apertures, and after the discharge apertures, each guiding element guiding an impulse of liquid corresponding to the divergent flow field and thereby contributing to forming the transverse speed components so that a longitudinal component of the flow speed has a substantially constant profile in each plane perpendicular to the main flow direction, the discharge apertures being made in different sizes in a graduated fashion to be smaller in a central region than in adjacent flank regions, a flow breaker including an overflow rim arranged in each case beneath or in front of the discharge apertures of individual or of all downcomers, at least some of the guide elements being arranged at the overflow rim of the flow breaker, each flow breaker being produced from a sheet metal strip, and wherein the guide elements are produced from the sheet metal strip by cutting and bending out of part areas.

14. A tray column in accordance with claim 13, wherein the discharge apertures (32) are arranged in a row;

wherein the guide elements (4) are each associated with one of the discharge apertures; and wherein each guide element adjoins a rim (33, 34) of the associated discharge opening.

15. A tray column according to claim 14 wherein the guide elements and the rim are welded together.

* * * * *